United States Patent
Buckingham et al.

(10) Patent No.: US 7,487,217 B2
(45) Date of Patent: Feb. 3, 2009

(54) NETWORK DOMAIN REPUTATION-BASED SPAM FILTERING

(75) Inventors: Jay T. Buckingham, Kirkland, WA (US); John D. Mehr, Seattle, WA (US); Paul S Rehfuss, Seattle, WA (US); Robert L. Rounthwaite, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 804 days.

(21) Appl. No.: 11/051,495

(22) Filed: Feb. 4, 2005

(65) Prior Publication Data

US 2006/0179113 A1  Aug. 10, 2006

(51) Int. Cl.
*G06F 15/16* (2006.01)
*G06F 12/001* (2006.01)
(52) U.S. Cl. .................................. 709/206; 709/207
(58) Field of Classification Search ............ 709/206, 709/207; 713/201, 202
See application file for complete search history.

(56) References Cited

U.S. PATENT DOCUMENTS

| | | | |
|---|---|---|---|
| 5,999,932 A * | 12/1999 | Paul | 707/10 |
| 6,321,267 B1 * | 11/2001 | Donaldson | 709/229 |
| 7,257,564 B2 * | 8/2007 | Loughmiller et al. | 706/16 |
| 2005/0091320 A1 * | 4/2005 | Kirsch et al. | 709/206 |
| 2006/0031314 A1 * | 2/2006 | Brahms et al. | 709/206 |
| 2006/0031319 A1 * | 2/2006 | Nelson et al. | 709/206 |
| 2006/0095586 A1 * | 5/2006 | Adelman et al. | 709/245 |
| 2006/0168006 A1 * | 7/2006 | Shannon et al. | 709/206 |

\* cited by examiner

*Primary Examiner*—Zarni Maung
(74) *Attorney, Agent, or Firm*—Lee & Hayes, PLLC

(57) ABSTRACT

Network domain reputation-based spam filtering is described. In an embodiment, emails are received from a network domain and a reputation of the network domain is established. Additional emails are filtered as they are received to determine a status of each email as spam email or not spam email. An email can be determined to be a spam email based on any one or more of the reputation of the network domain, an authentication status of an email, and other information that can be derived from an email.

19 Claims, 6 Drawing Sheets

NETWORK DOMAIN REPUTATION-BASED SPAM FILTERING

TECHNICAL FIELD

This invention relates to spam filtering.

BACKGROUND

Electronic mail, also commonly referred to as "email" or "e-mail", is increasingly utilized as an electronic form of communication via the Internet. Spam is unsolicited email often sent to email distribution lists that include a large number of users' email addresses. Spam is similar to telemarketing and is the electronic equivalent of "junk mail" used to advertise products and services, request charitable donations, or to broadcast some political or social commentary. Spamming is the practice of sending an unsolicited email message to large numbers of email addresses indiscriminately. Spam emails are often unwanted by the many recipients and are considered a waste of not only the recipients' time, but network bandwidth.

Spam email can also appear to be from a trusted site because a spammer can spoof the domain name from which the spam email originates. Domain spoofing is often used so that a recipient will think a spam email comes from a legitimate source. A recipient may be tricked into opening a spam email that is not from the trusted sender the email purports to be from. The SMTP (Simple Mail Transfer Protocol) does not authenticate the sender of an email message and a spam email from a spoofed domain name may not be detected as a spam email. For example, there is no guarantee that an email which appears to be from msn.com is actually from MSN.

SenderID is a particular authentication protocol for email designed to protect against domain spoofing. A spammer can forge, or spoof, the domain that an email purports to be from, but can not forge the IP (Internet protocol) address of the computer that sends an email message. For SenderID, a domain that sends email publishes a list of IP addresses of the computers that are allowed to send email for the domain. This list of IP addresses is stored as a TXT record in the DNS (Domain Name Server) system which is part of the Internet infrastructure and a repository of information about domains. The DNS system primarily maintains the mapping between symbolic domain names and corresponding IP addresses.

When an email message is received by an inbound email server, the server obtains the sending computer's IP address and extracts the domain that the email purports to be from. The domain that the email purports to be from is identified as the purported responsible domain (PRD). The inbound email server obtains the SenderID record for the PRD from the DNS and determines whether the IP address is on that list of IP addresses allowed to send email from the particular domain. If so, the sender has been authenticated. The authentication status can then be used to determine what to do and/or where to route the email message. The email can be deleted, delivered to the intended recipient's junk email folder, or delivered to the intended recipient's Inbox.

Although SenderID is a step forward to detect spam emails, SenderID on its own does not prevent spammers from generating and attempting to distribute spam emails. For example, a spammer can setup SenderID for a domain (e.g., publish a list of the server IP addresses associated with the domain to send out email) and then use the domain to send spam emails. A spam email from the spammer that owns the domain can be authenticated (e.g., passed as a legitimate email) because the email is communicated through a service provider that has an IP address matching the DNS record for the domain. However, an authenticated spam email is still an unwanted spam email.

Alternatively, an email that is not authenticated is not necessarily a spam email. The email may not be identifiable by SenderID, but instead may be communicated through a third-party service provider that is not currently recognized by the SenderID protocol. Accordingly, a SenderID "pass" does not always indicate that an email is a legitimate email, and a SenderID "fail" does not always indicate that an email is a spam email.

SUMMARY

Network domain reputation-based spam filtering is described herein.

In an implementation of network domain reputation-based spam filtering, emails are received from a network domain and a domain reputation of the network domain is established based on the determined spam status of the received emails. Additional emails are filtered as they are received to determine a status of each email as spam email or not spam email. An email can be determined to be a spam email based on any one or more of the reputation of the network domain, an authentication status of an email, and other information that can be derived from an email.

BRIEF DESCRIPTION OF THE DRAWINGS

The same numbers are used throughout the drawings to reference like features and components.

DETAILED DESCRIPTION

Network domain reputation-based spam filtering is implemented to detect spam emails received from network domains. The reputation of an authenticated network domain can be established by evaluating emails that are received from the network domain and determining whether each of the emails is a spam email or not. Subsequent emails received from the network domain can be filtered as they are received and, based on the authentication result and established reputation of the network domain, a status of each email can be determined as a spam email or not a spam email. Additionally, the status of an email as a spam email or not a spam email can be determined based on an authentication status of the email and/or based on other information that can be derived from the email.

While aspects of the systems and methods described for network domain reputation-based spam filtering can be implemented in any number of different computing systems, environments, and/or configurations, embodiments of network domain reputation-based spam filtering are described in the context of the following exemplary system architectures.

Figure 1:
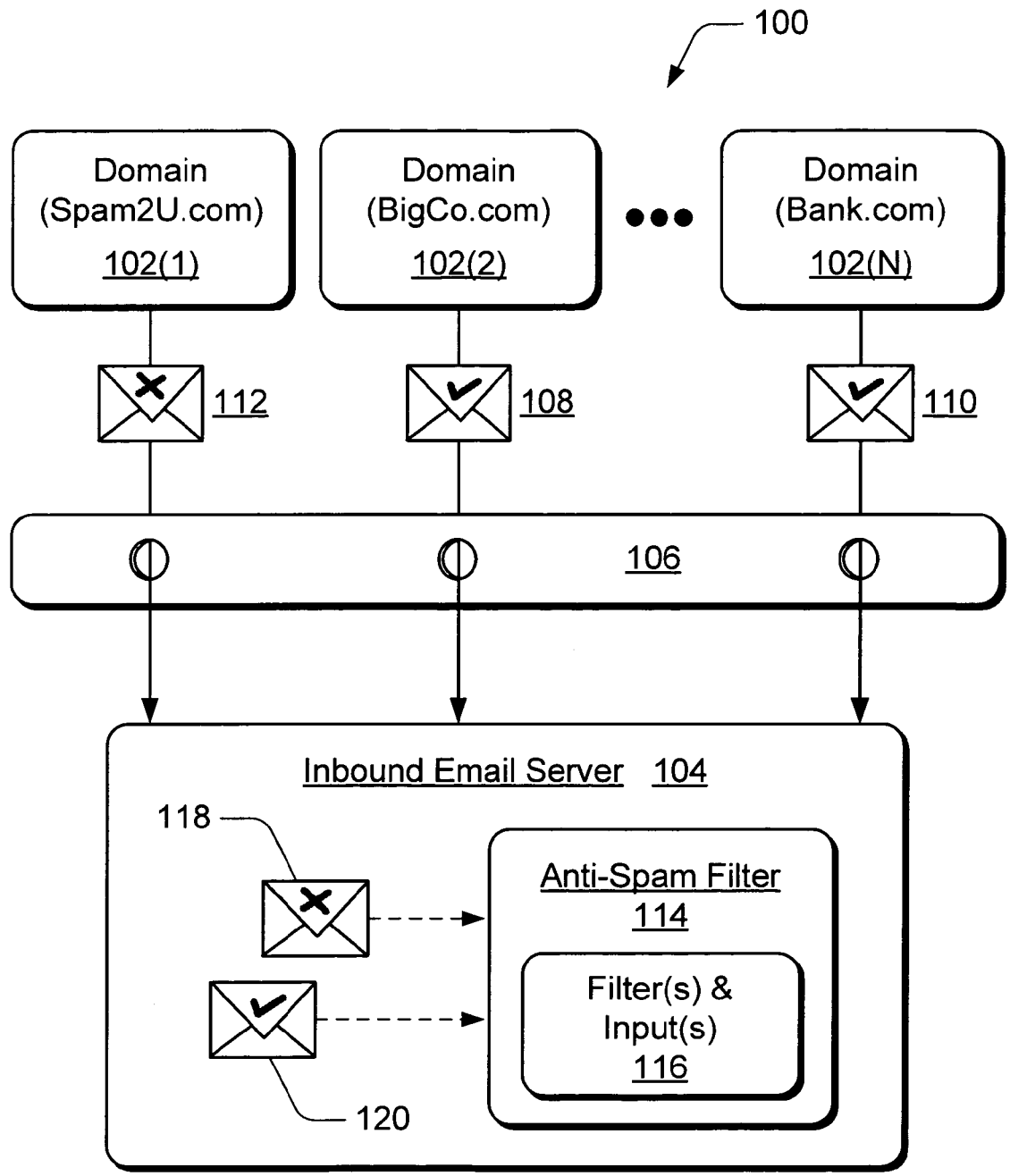
FIG. 1 illustrates an exemplary email system in which embodiments of network domain reputation-based spam filtering can be implemented.

FIG. 1 illustrates an exemplary email system 100 in which embodiments of network domain reputation-based spam filtering can be implemented. The email system 100 includes network domains 102(1-N) and an inbound email server 104 each configured for communication via a communication network 106, such as the Internet. A network domain 102 and/or the inbound email server 104 may be implemented as any form of computing or electronic device with any number and combination of differing components as described below with reference to the exemplary computing environment 600 shown in FIG. 6.

In an implementation of the exemplary email system 100, emails are generated at a network domain 102 and delivered to the inbound email server 104 for distribution to one or more client devices (not shown). For example, network domain 102(2) (identified as BigCo.com) generates and communicates company emails 108 to the inbound email server 104 for distribution to client devices, such as to customers of the company. Similarly, network domain 102(N) (identified as Bank.com) generates and communicates business emails 110 to the inbound email server 106 for distribution to client devices, such as to customers of the Bank.

In this example, network domain 102(1) (identified as Spam2U.com) is a source of unwanted spam emails 112, some of which are communicated to the inbound email server 106 for distribution to client devices, such as intended recipients of the spam emails 112. The inbound email server 104 includes an anti-spam filter 114 which can be implemented with any number of different filters and inputs 116 to detect the spam emails 112 based on sender reputation and/or other information that can be derived from an email. The anti-spam filter 114 receives spam emails 118 (e.g., spam emails 112 from Spam2U.com) and business and company emails 120 (e.g., company emails 108 from BigCo.com and business emails 110 from Bank.com).

The anti-spam filter 114 can be implemented in an email server 104 to receive emails and to determine the status of an email as being a spam email or not a spam email based on the reputation of the sender of the email and/or based on other information that pertains to a received email. Examples of the other information that pertains to an email include an IP (Internet protocol) address of the computer that communicates the email message, an authentication status of the email (e.g., SenderID authentication), one or more message features derived from the text of the email, special features such as the time and day that the message was originated, and/or any combination thereof.

Although network domain reputation-based spam filtering is described with reference to email communications, alternative embodiments of reputation-based spam filtering can apply to any form of electronic messaging via which unwanted communications are distributed and received. For example, various embodiments of sender reputation-based spam filtering can be adapted for conferencing applications, chat programs, instant messaging, and for any other type of messaging system that can implement the spam filtering to detect unwanted text and messages.

Figure 2:
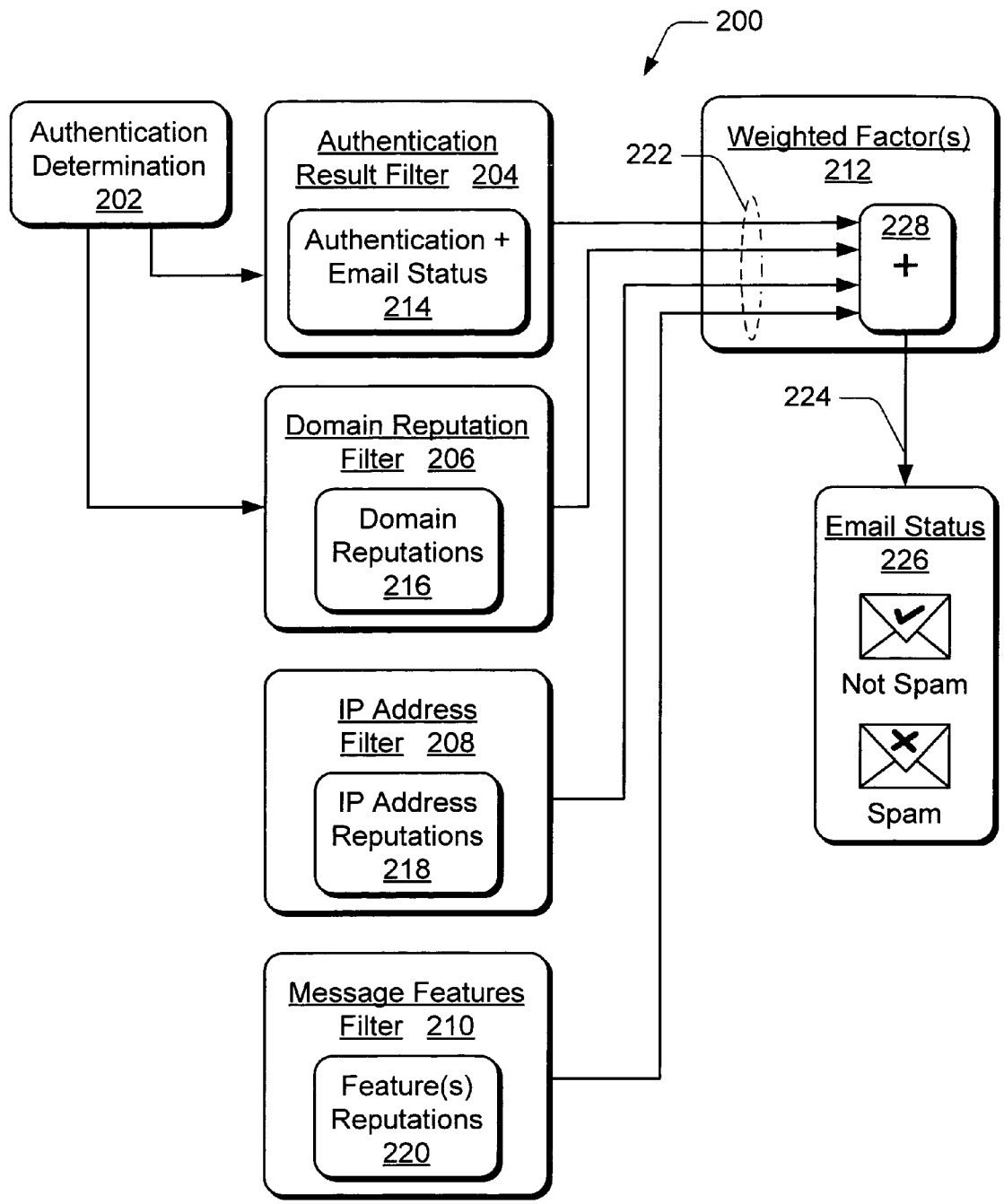
FIG. 2 illustrates an exemplary network domain reputation-based spam filter.

FIG. 2 illustrates an embodiment of a spam filter 200, an example of which is the anti-spam filter 114 shown in FIG. 1. The spam filter 200 can include any combination of various filters and inputs from which the spam status of received emails can be determined. In this example, the spam filter 200 includes an authentication determination 202, an authentication result filter 204, a domain reputation filter 206, an IP address filter 208, a message features filter 210, and weighted factor(s) 212. The authentication determination 202 can be obtained from a SenderID authentication system, for example, or from any other similar email authenticating system. The authentication result filter 204 includes an authentication and email status correlation 214 that correlates a SenderID result with the status of an email message (e.g., spam or not spam).

Domain reputation filter 206 includes domain reputations 216 which each correspond to a particular network domain 102. A reputation 216 for an authenticated domain can be established by evaluating emails that are received from a particular network domain 102 along with the sender authentication determination 202, and determining whether each of the emails is a spam email or not. Alternatively and/or in addition, a domain reputation can be established via a statistical machine learning process. Each domain reputation 216 is a learned reputation that is established separately for each respective network domain that sends out emails. For example, a domain reputation 216 corresponds to network domain 102(1) and identifies Spam2U.com as having a bad reputation for generating unwanted spam emails. Similarly, domain reputations 216 each correspond to respective network domains 102(2) and 102(N) and identify BigCo.com and Bank.com as having a good reputation for generating company and/or business emails that are not spam emails.

The term "bad" is merely descriptive and used herein to describe the reputation of a particular network domain that typically generates spam emails. A network domain that has a "bad" reputation generally sends out, or originates, more spam email communications than a particular network domain that has a "good" reputation for not generating unwanted spam email communications. Any other comparison-based terminology or numerology can be utilized to indicate the reputation of a network domain that generates unwanted spam emails when compared to the reputation of a network domain that does not generate spam emails.

The IP address filter 208 includes IP address reputations 218 which each correspond to a particular computer that originates, or sends out, an email from a network domain. For example, an IP address reputation 218 corresponds to a computer that sends out emails from domain 102(1) and identifies the domain computer as having a bad reputation for communicating spam emails 112 from network domain 102(1).

The message features filter 210 includes content and features filters 220 which each correspond to a particular message feature of received emails. A content filter 220 can correspond to words, a combination of words, and/or character strings in an email message, such as "debt", "lose weight", "free quote", and the like which likely indicate a spam email. In addition, a message feature in a filter 220 can correspond to the time of day and/or the day of a week that an email is sent, the size of the email, the subject of the email, the number of recipients that the email is addressed to, and/or any number of other message features.

The weighted factor(s) 212 receives inputs 222 from one or more of the authentication result filter 204, domain reputation filter 206, IP address filter 208, and message features filter 210. An output 224 of the weighted factors 212 is any combination of the one or more inputs 222. The weighted factors 212 assign a reputation factor, or weight, to any combination of the inputs 222 to establish a weight for each input or combination of inputs that can be utilized as a component of the spam filter 200. The weighted factors 212 are learned and established over a time duration, and can be utilized as a fallback for those network domains that communicate emails but are not registered with SenderID.

An email status 226 of a received email is determined to be either spam or not spam based on input 224 from the weighted factors 212. In an embodiment, input 224 is derived from weighted factors 212 as a score 228, and the status 226 of an email is based on the score corresponding to the email.

Figure 3:
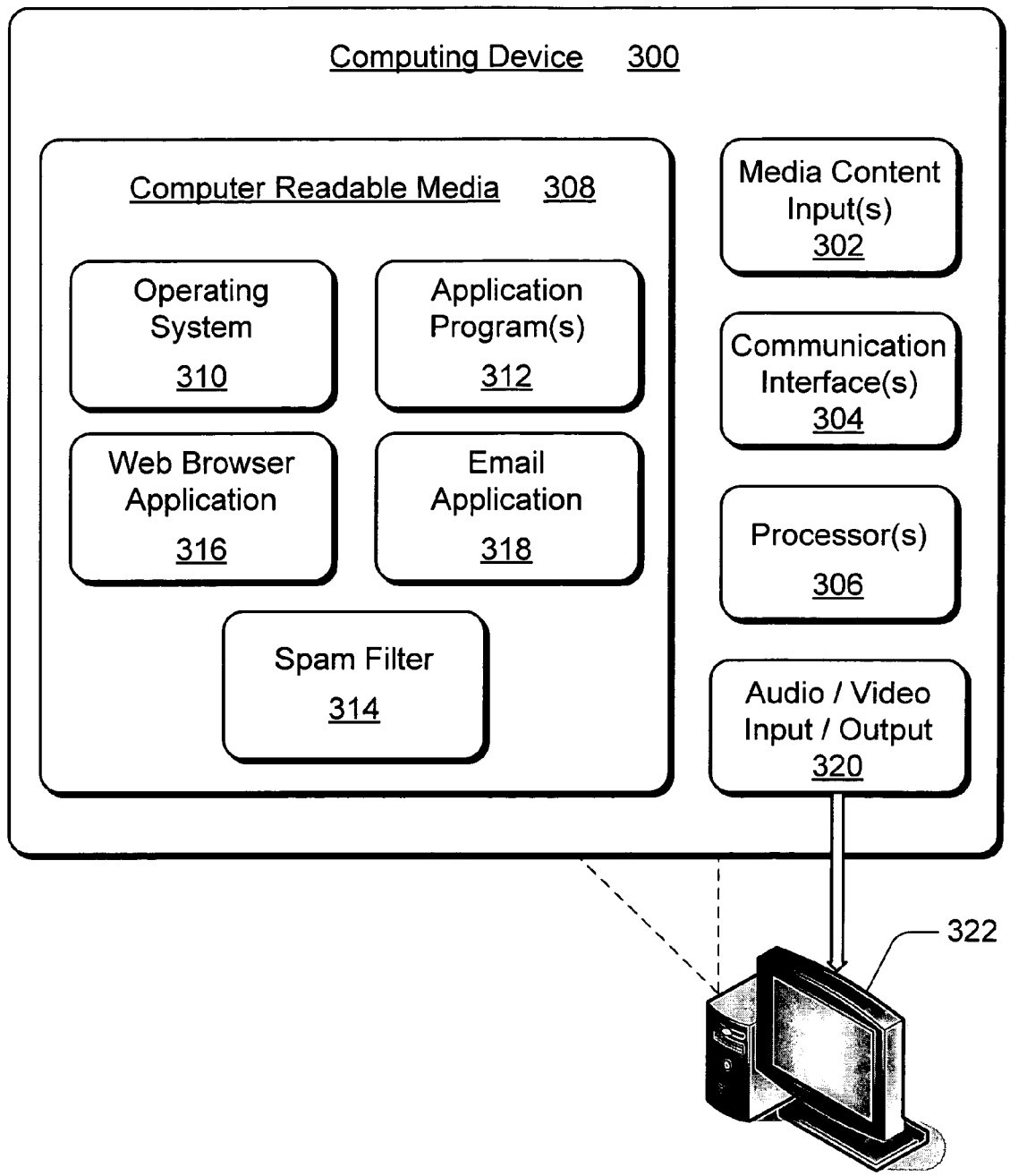
FIG. 3 illustrates an exemplary computing device that can be implemented as a client device or as an email server shown in FIG. 1, and in which embodiments of network domain reputation-based spam filtering can be implemented.

FIG. 3 illustrates various components of an exemplary computing device 300 in which embodiments of network domain reputation-based spam filtering can be implemented. Exemplary computing device 300 can be implemented as a client device, or can be implemented as the inbound email server 104 in the exemplary email system 100 described with reference to FIG. 1. Computing device 300 can also be implemented as any form of computing or electronic device with any number and combination of differing components as described below with reference to the exemplary computing environment 600 shown in FIG. 6.

Computing device 300 includes one or more media content inputs 302 which may include Internet Protocol (IP) inputs over which streams of media content are received via an IP-based network. Computing device 300 further includes communication interface(s) 304 which can be implemented as any one or more of a serial and/or parallel interface, a wireless interface, any type of network interface, and as any other type of communication interface. A wireless interface enables computing device 300 to receive control input commands and other information from an input device, such as from a remote control device or from another infrared (IR), 802.11, Bluetooth, or similar RF input device.

A network interface provides a connection between computing device 300 and a communication network (e.g., network 106 shown in FIG. 1) by which other electronic and computing devices can communicate data with computing device 300. Similarly, a serial and/or parallel interface provides for data communication directly between computing device 300 and the other electronic or computing devices.

Computing device 300 also includes one or more processors 306 (e.g., any of microprocessors, controllers, and the like) which process various computer executable instructions to control the operation of computing device 300, to communicate with other electronic and computing devices, and to implement embodiments of network domain reputation-based spam filtering. Computing device 300 can be implemented with computer readable media 308, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 308 provides data storage mechanisms to store various information and/or data such as software applications and any other types of information and data related to operational aspects of computing device 300. For example, an operating system 310, other application programs 312, and an embodiment of a spam filter 314 can be maintained as software applications with the computer readable media 308 and executed on processor(s) 306 to implement embodiments of network domain reputation-based spam filtering. Examples of the spam filter 314 include anti-spam filter 118 shown in FIG. 1 and the spam filter 200 shown in FIG. 2.

Application programs 312 can include a browser application 316 and an email application 318 when computing device 300 is implemented as a client device. The email application 318 facilitates email communication and provides a user interface through which a user can interact with a mail service provider and/or the inbound email server 106.

Computing device 300 also includes an audio and/or video input/output 320 that provides audio and video to an audio rendering and/or display device 322, or to other devices that process, display, and/or otherwise render audio, video, and display data. Video signals and audio signals can be communicated from computing device 300 to display device 322 via an RF (radio frequency) link, S-video link, composite video link, component video link, analog audio connection, or other similar communication links.

Although shown separately, some of the components of computing device 300 may be implemented in an application specific integrated circuit (ASIC). Additionally, a system bus (not shown) typically connects the various components within computing device 300. A system bus can be implemented as one or more of any of several types of bus structures, including a memory bus or memory controller, a peripheral bus, an accelerated graphics port, or a local bus using any of a variety of bus architectures.

Methods for network domain reputation-based spam filtering, such as exemplary methods 400 and 500 described with reference to respective FIGS. 4 and 5, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 4:
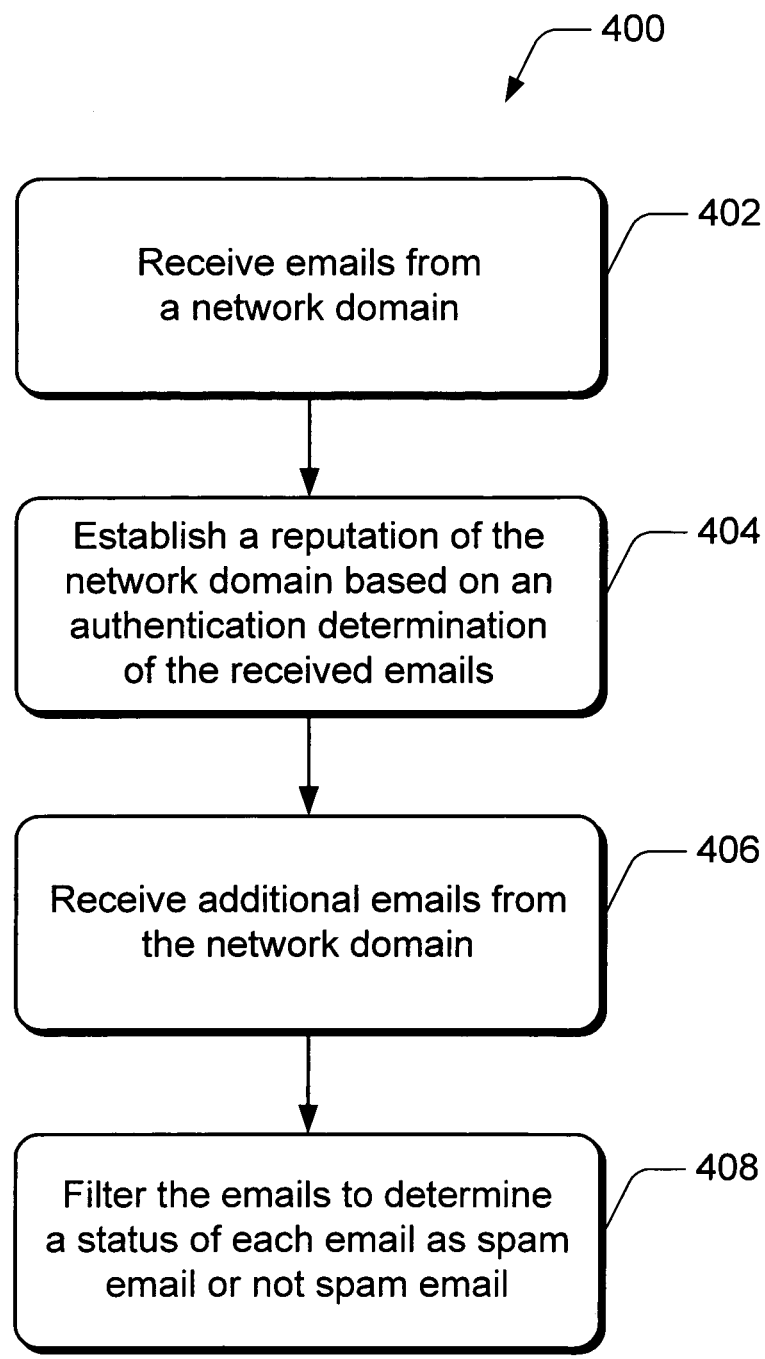
FIG. 4 is a flow diagram that illustrates an exemplary method for network domain reputation-based spam filtering.

FIG. 4 illustrates an exemplary method 400 for network domain reputation-based spam filtering and is described with reference to the exemplary email system 100 and the spam filters 118 and 200 shown in respective FIGS. 1 and 2. The order in which the method is described is not intended to be construed as a limitation, and any number of the described method blocks can be combined in any order to implement the method. Furthermore, the method can be implemented in any suitable hardware, software, firmware, or combination thereof.

At block 402, emails are received from a network domain. For example, inbound email server 104 (FIG. 1) receives company emails 108 (e.g., not spam emails) from network domain 102(2), and receives spam emails 112 from network domain 102(1). At block 404, a reputation of the network domain is established based on an authentication determination and the spam status (spam or not spam) of the emails received from the network domain. For example, a domain reputation 216 (FIG. 2) is established for a particular network domain 102 by evaluating emails that are received from the network domain 102 and determining whether each of the emails is a spam email or not. Separate domain reputations 216 are established for each combination of an authentication determination 202 and purported domain 102 from which an email is originated.

At block 406, additional emails are received from the network domain. At block 408, the additional emails are filtered to determine a status of each email as spam email or not spam email. The status of an email can be determined based on the reputation of the network domain, based on an authentication determination of the email, based on the reputation of the network domain and a message feature of the email, based on the reputation of the network domain and a computing device via which the additional emails are received from the network domain, and/or any combination thereof. For example, an email can be received by each of the authentication result filter 204, domain reputation filter 206, IP address filter 208, and/or message features filter 210 for input to weighted factors 212 which generates a score 228 from which an email status 226 is determined.

Figure 5:
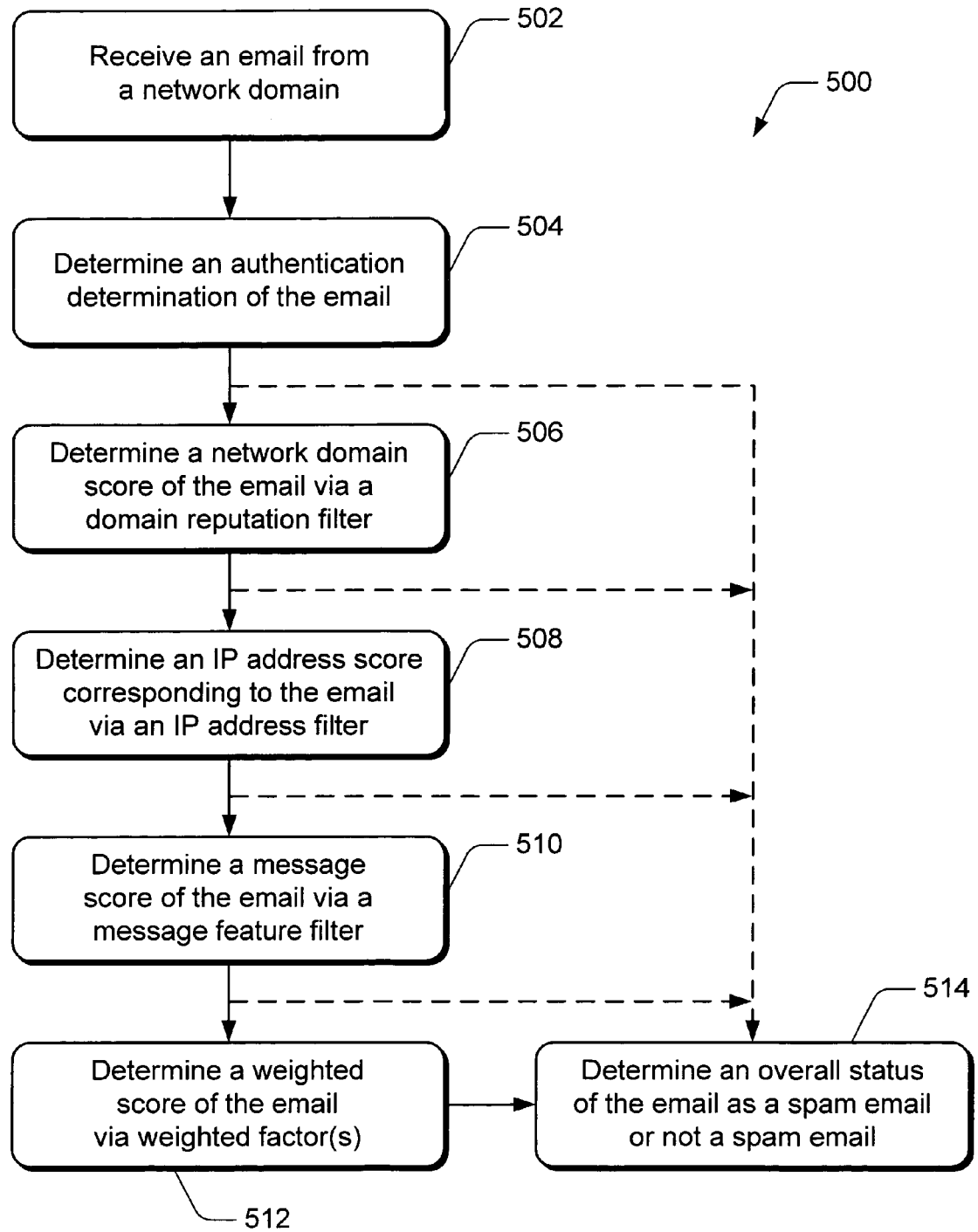
FIG. 5 is a flow diagram that illustrates another exemplary method for network domain reputation-based spam filtering.

FIG. 5 illustrates an exemplary method 500 for network domain reputation-based spam filtering and is described with reference to the exemplary email system 100 and the spam filters 118 and 200 shown in respective FIGS. 1 and 2. The order in which the method is described is not intended to be construed as a limitation, and any number of the described method blocks can be combined in any order to implement the method. Furthermore, the method can be implemented in any suitable hardware, software, firmware, or combination thereof.

At block 502, an email is received from a network domain. For example, inbound email server 104 (FIG. 1) receives company emails 108 (e.g., not spam emails) from network domain 102(2), receives business emails 110 (e.g., not spam emails) from network domain 102(N), and receives spam emails 112 from network domain 102(1). At block 504, an authentication determination of the email is determined. For example, authentication determination 202 receives the email and returns an authentication result code. For SenderID, results codes include Pass, Fail, Neutral, Softfail, TempError, PermError, and None. Exemplary method 500 can authenticate an email received from a network domain 102 using SenderID, but is not limited to this authentication method.

At block 506, a network domain score of the email is determined via a domain reputation filter. For example, domain reputation filter 206 compares the network domain from which the received email originated to a domain reputation 216 corresponding to the network domain to determine a score of the email based on the network domain reputation 216.

At block 508, an IP address spam score of the email is determined via an IP address filter. For example, IP address filter 208 compares an IP address of a computing device in the network domain via which the email is received from the network domain to an IP address reputation 218 corresponding to the computing device to determine a score of the email based on the IP address reputation 218.

At block 510, a message score of the email is determined via a message feature filter. For example, message features filter 210 compares a message feature of the received email to a message feature reputation 220 corresponding to the message feature of the received email to determine a score of the email based on the message feature reputation 220.

At block 512, a weighted status of the email is determined via weighted factor(s). For example, one or more outputs of the authentication result filter 204, domain reputation filter 206, IP address filter 208, and message features filter 210 are input 222 to the weighted factors 212. An output 224 of the weighted factor(s) 212 is determined as any one or combination of the inputs 222. A status 226 of the received email can be determined based on the weighted factor(s) 212 and a score 228 corresponding to the received email.

At block 514, an overall status of the email is determined as a spam email or not a spam email based on any one or more of the inputs. For example, any combination of the authentication score (block 504), the network domain score (block 506), the IP address score (block 508), the message score (block 510), and/or the weighted score (block 512) is combined to determine an overall email status 226 of the email.

Figure 6:
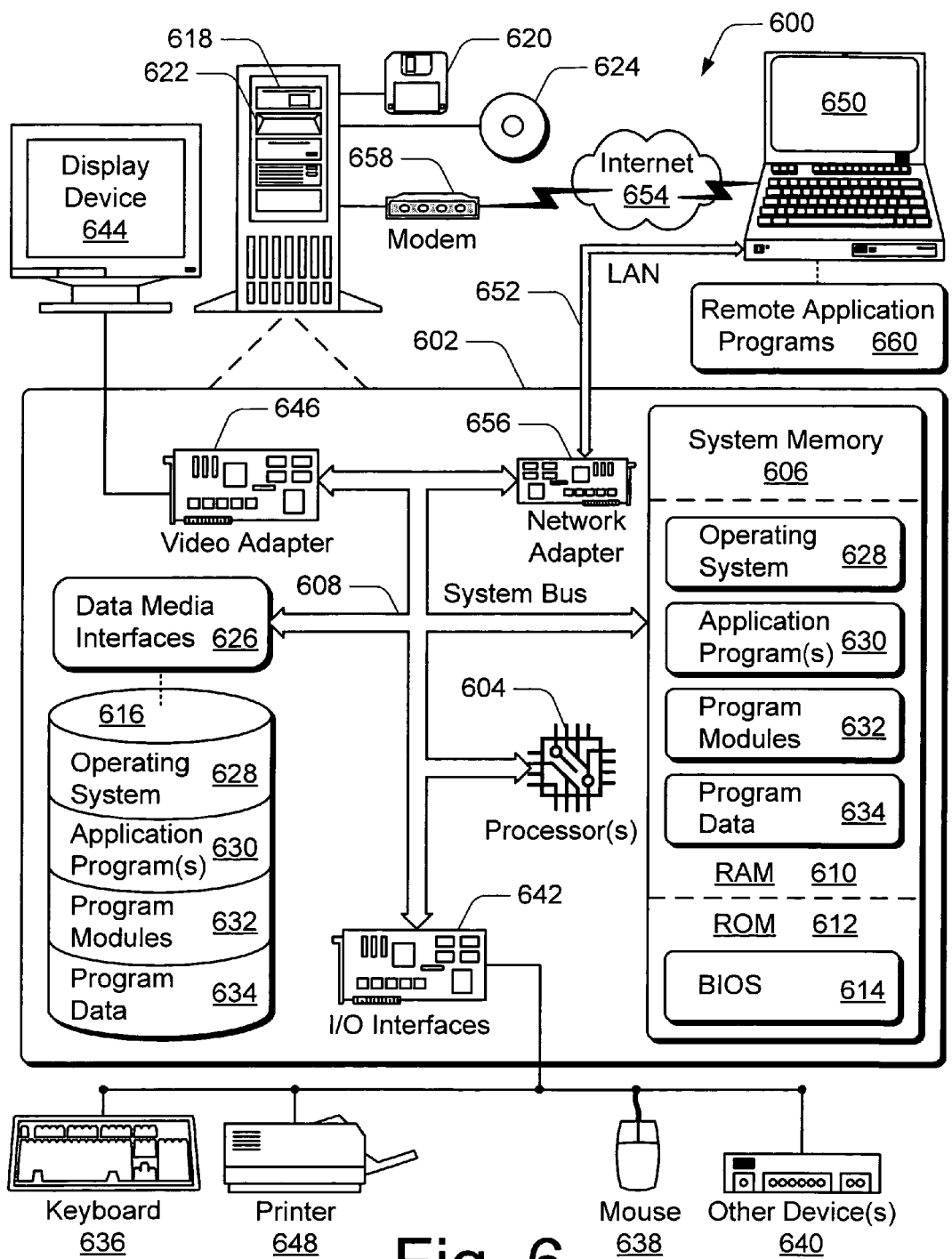
FIG. 6 illustrates exemplary computing systems, devices, and components in an environment that network domain reputation-based spam filtering can be implemented.

FIG. 6 illustrates an exemplary computing environment 600 within which network domain reputation-based spam filtering systems and methods, as well as the computing, network, and system architectures described herein, can be either fully or partially implemented. Exemplary computing environment 600 is only one example of a computing system and is not intended to suggest any limitation as to the scope of use or functionality of the architectures. Neither should the computing environment 600 be interpreted as having any dependency or requirement relating to any one or combination of components illustrated in the exemplary computing environment 600.

The computer and network architectures in computing environment 600 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 600 includes a general-purpose computing system in the form of a computing device 602. The components of computing device 602 can include, but are not limited to, one or more processors 604 (e.g., any of microprocessors, controllers, and the like), a system memory 606, and a system bus 608 that couples the various system components. The one or more processors 604 process various computer executable instructions to control the operation of computing device 602 and to communicate with other electronic and computing devices. The system bus 608 represents any number of several types of bus structures, including a memory bus or memory controller, a peripheral bus, an accelerated graphics port, and a processor or local bus using any of a variety of bus architectures.

Computing environment 600 includes a variety of computer readable media which can be any media that is accessible by computing device 602 and includes both volatile and non-volatile media, removable and non-removable media. The system memory 606 includes computer readable media in the form of volatile memory, such as random access memory (RAM) 610, and/or non-volatile memory, such as read only memory (ROM) 612. A basic input/output system (BIOS) 614 maintains the basic routines that facilitate information transfer between components within computing device 602, such as during start-up, and is stored in ROM 612. RAM 610 typically contains data and/or program modules that are immediately accessible to and/or presently operated on by one or more of the processors 604.

Computing device 602 may include other removable/non-removable, volatile/non-volatile computer storage media. By way of example, a hard disk drive 616 reads from and writes to a non-removable, non-volatile magnetic media (not shown), a magnetic disk drive 618 reads from and writes to a removable, non-volatile magnetic disk 620 (e.g., a "floppy disk"), and an optical disk drive 622 reads from and/or writes to a removable, non-volatile optical disk 624 such as a CD-ROM, digital versatile disk (DVD), or any other type of optical media. In this example, the hard disk drive 616, magnetic disk drive 618, and optical disk drive 622 are each connected to the system bus 608 by one or more data media interfaces 626. The disk drives and associated computer readable media provide non-volatile storage of computer readable instructions, data structures, program modules, and other data for computing device 602.

Any number of program modules can be stored on RAM 610, ROM 612, hard disk 616, magnetic disk 620, and/or optical disk 624, including by way of example, an operating system 628, one or more application programs 630, other program modules 632, and program data 634. Each of such operating system 628, application program(s) 630, other program modules 632, program data 634, or any combination thereof, may include one or more embodiments of the systems and methods described herein.

Computing device 602 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 602 via any number of different input devices such as a keyboard 636 and pointing device 638 (e.g., a "mouse"). Other input devices 640 (not shown specifically) may include a microphone, joystick, game pad, controller, satellite dish, serial port, scanner, and/or the like. These and other input devices are connected to the processors 604 via input/output interfaces 642 that are coupled to the system bus 608, but may be connected by other interface and bus structures, such as a parallel port, game port, and/or a universal serial bus (USB).

A display device 644 (or other type of monitor) can be connected to the system bus 608 via an interface, such as a video adapter 646. In addition to the display device 644, other output peripheral devices can include components such as speakers (not shown) and a printer 648 which can be connected to computing device 602 via the input/output interfaces 642.

Computing device 602 can operate in a networked environment using logical connections to one or more remote computers, such as remote computing device 650. By way of example, remote computing device 650 can be a personal computer, portable computer, a server, a router, a network computer, a peer device or other common network node, and the like. The remote computing device 650 is illustrated as a portable computer that can include any number and combination of the different components, elements, and features described herein relative to computing device 602.

Logical connections between computing device 602 and the remote computing device 650 are depicted as a local area network (LAN) 652 and a general wide area network (WAN) 654. Such networking environments are commonplace in offices, enterprise-wide computer networks, intranets, and the Internet. When implemented in a LAN networking environment, the computing device 602 is connected to a local network 652 via a network interface or adapter 656. When implemented in a WAN networking environment, the computing device 602 typically includes a modem 658 or other means for establishing communications over the wide area network 654. The modem 658 can be internal or external to computing device 602, and can be connected to the system bus 608 via the input/output interfaces 642 or other appropriate mechanisms. The illustrated network connections are merely exemplary and other means of establishing communication link(s) between the computing devices 602 and 650 can be utilized.

In a networked environment, such as that illustrated with computing environment 600, program modules depicted relative to the computing device 602, or portions thereof, may be stored in a remote memory storage device. By way of example, remote application programs 660 are maintained with a memory device of remote computing device 650. For purposes of illustration, application programs and other executable program components, such as operating system 628, are illustrated herein as discrete blocks, although it is recognized that such programs and components reside at various times in different storage components of the computing device 602, and are executed by the one or more processors 604 of the computing device 602.

Although embodiments of network domain reputation-based spam filtering have been described in language specific to structural features and/or methods, it is to be understood that the subject of the appended claims is not necessarily limited to the specific features or methods described. Rather, the specific features and methods are disclosed as exemplary implementations of network domain reputation-based spam filtering.

The invention claimed is:

1. An email system, comprising:
   an email server configured to receive emails from a network domain; and
   a spam filter configured to determine a status of an email based on a reputation of the network domain and a message feature of the email, the status of the email determined to be at least one of spam email or not spam email,
   wherein the message feature includes at least one of the following: the size of the email, number of recipients, time of day, or day of the week.

2. An email system as recited in claim 1, wherein the reputation of the network domain is established based on an authentication determination of additional emails received from the network domain.

3. An email system as recited in claim 1, wherein the reputation of the network domain can be modified based on the determined status of the emails received from the network domain.

4. An email system as recited in claim 1, wherein the spam filter is further configured to determine the status of the email based on the reputation of the network domain and an authentication determination.

5. An email system as recited in claim 1, wherein the emails are received from a computing device in the network domain, and wherein the spam filter is further configured to determine the status of the email based on the reputation of the network domain and the computing device.

6. An email system as recited in claim 1, wherein the emails are received from a computing device in the network domain, and wherein the spam filter is further configured to determine the status of the email based on an authentication determination of the email and based on the reputation of the network domain and the computing device.

7. An email system as recited in claim 1, further comprising a domain reputation filter configured to determine a score corresponding to the email based on the reputation of the network domain and an authentication determination, and wherein the spam filter includes the domain reputation filter and is further configured to determine the status of the email based on the score corresponding to the email.

8. An email system as recited in claim 1, further comprising:
- a domain reputation filter configured to determine a first score of the email based on the reputation of the network domain;
- an IP address filter configured to determine a second score of the email based on a reputation of a computing device via which the email is received from the network domain; and
- wherein the spam filter includes the domain reputation filter and the IP address filter and is further configured to determine the status of the email based on a combination of the first score of the email and the second score of the email.

9. A method, comprising:
- receiving emails from a network domain;
- establishing a reputation of the network domain based on an authentication determination of each of the emails received from the network domain;
- receiving additional emails from the network domain; and
- filtering the additional emails to determine a status of each email as spam email or not spam email based on the reputation of the network domain and a message feature of the email,
- wherein the message feature includes at least one of the following: the size of the email, number of recipients, time of day, or day of the week.

10. A method as recited in claim 9, further comprising determining the status of each of the additional emails based on the reputation of the network domain and an authentication determination.

11. A method as recited in claim 9, further comprising determining the status of each of the additional emails based on the reputation of the network domain and a message feature of each of the additional emails.

12. A method as recited in claim 9, further comprising determining the status of each of the additional emails based on the reputation of the network domain and a computing device via which the additional emails are received from the network domain.

13. A method as recited in claim 9, further comprising determining the status of each of the additional emails based on an authentication determination of an email and based on the reputation of the network domain and a computing device via which the additional emails are received from the network domain.

14. A method as recited in claim 9, wherein filtering the additional emails includes filtering the additional emails to determine a score corresponding to each of the additional emails based on the reputation of the network domain and a sender authentication determination, and wherein the status the each email is based on the score corresponding to the email.

15. A method as recited in claim 9, wherein filtering the emails includes:
- determining a first status of an email based on the reputation of the network domain;
- determining a second status of the email based on a reputation of a computing device via which the email is received from the network domain;
- determining a third status of the email based on a message feature of the email; and
- determining the status of the email as spam email or not spam email based on a combination of the first status of the email, the second status of the email, and the third status of the email.

16. One or more computer readable storage media comprising computer executable instructions that, when executed by a processor, directs a spam email filter to:
- establish a reputation of a network domain based on an authentication determination of emails received from the network domain;
- receive one or more additional emails from the network domain; and
- filter an additional email received from the network domain to determine a status of the email based on the reputation of the network domain and a message feature of the email,
- wherein the message feature includes at least one of the following: the size of the email, number of recipients, time of day, or day of the week.

17. One or more computer readable media as recited in claim 16, further comprising computer executable instructions that, when executed, direct the spam email filter to determine the status of the additional email as spam email or not spam email based on the reputation of the network domain and an authentication determination.

18. One or more computer readable media as recited in claim 16, further comprising computer executable instructions that, when executed, direct the spam email filter to determine the status of the additional email as spam email or not spam email based on the reputation of the network domain and a computing device via which the additional email is received from the network domain.

19. One or more computer readable media as recited in claim 16, further comprising computer executable instructions that, when executed, direct the spam email filter to filter the additional email to determine a score corresponding to the additional email based on the reputation of the network domain and a sender authentication determination, and determine the status of the additional email based on the score corresponding to the additional email.

* * * * *